April 21, 1964 J. F. BERES ETAL 3,130,374
NEGATIVE FEEDBACK TONE CONTROL CIRCUIT
Filed July 24, 1962
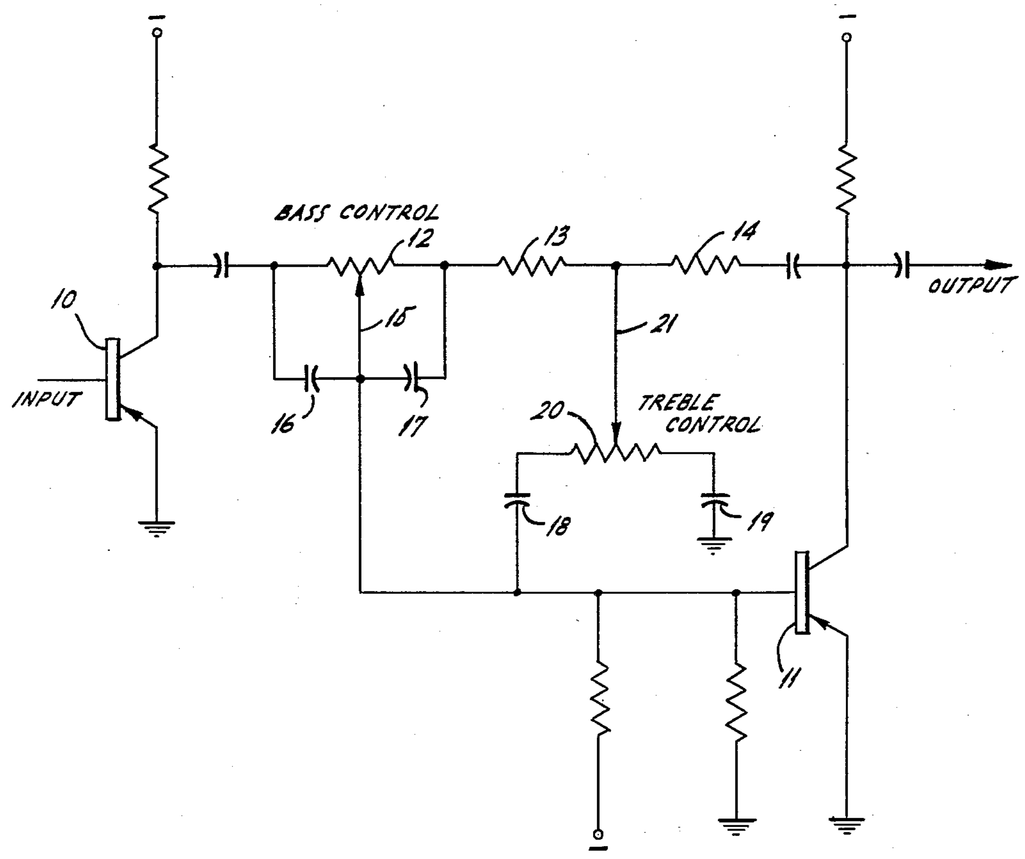
INVENTORS
JOHN F. BERES
ABRAM HOPENGARTEN
RICHARD F. WOOD
BY Fordyce A. Bothwell
ATTORNEY United States Patent Office 3,130,374
Patented Apr. 21, 1964

3,130,374
NEGATIVE FEEDBACK TONE CONTROL CIRCUIT
John F. Beres, Southampton, and Abram Hopengarten, Lafayette Hills, Pa., and Richard F. Wood, Marlton, N.J., assignors to Philco Corporation, Philadelphia, Pa., a corporation of Delaware
Filed July 24, 1962, Ser. No. 212,095
6 Claims. (Cl. 330—28)

This invention relates to negative feedback tone control circuits having independent bass and treble controls. More particularly the invention relates to a novel tone control circuit for use with transistors.

A negative feedback tone control circuit has the advantage of inherent low distortion. However other desirable features are simplicity, good isolation of the bass and treble controls, and realization of gain. Prior tone control circuits of this type generally have been deficient in respect to one or more of these features.

One object of the present invention is to provide an improved tone control circuit which overcomes the deficiencies of prior circuits.

Another object of the invention is to provide such a tone control circuit suitable for use with transistors.

An important feature of the circuit provided by this invention is that the treble control is effected entirely by feedback, whereas the bass control is effected both by input attenuation and by feedback. Isolation between the two controls is effected in the feedback network, which reduces losses to a minimum. This is particularly important in a transistor circuit where low impedances are involved.

In a preferred embodiment of the circuit provided by this invention, first and second resistors are serially connected in a feedback connection between a first transistor and the collector of a second transistor. A manually-movable tap is provided on said first resistor and is connected to the base of said second transistor. A capacitive means is connected between said tap and each end of said first resistor. A resistor and capacitive means are serially connected between said base and a point of fixed reference potential. A manually-movable tap is provided on the latter resistor and is connected to said feedback connection so as to be isolated from said first resistor by said second resistor.

The invention may be fully understood from the following detailed description with reference to the accompanying drawing in which the single figure is a schematic illustration of a preferred embodiment of the circuit provided by this invention.

In this circuit there are first and second transistors 10 and 11. Connected serially between the collectors of the two transistors are resistors 12, 13 and 14, although resistor 14 is not essential. The first resistor 12 has a manually movable tap 15 which is connected to the base of transistor 11. Resistor 12 is the bass control and it is by-passed for frequencies above a predetermined value, e.g. 500 cycles, by capacitors 16 and 17.

A pair of capacitors 18 and 19 and an intermediate resistor 20 are serially connected between the base of transistor 11 and a point of fixed reference potential, i.e. ground. A manually-movable tap 21 on resistor 20 is connected to the junction of resistors 13 and 14. The network comprising resistor 20 and capacitors 18 and 19 is the treble control.

The negative feedback through resistors 13 and 14 and capacitor 17 to the base of transistor 11 is such that with the treble control at its mid-point all frequencies above 500 cycles are attenuated to the desired level of the mid-frequencies in the audio passband. Resistor 12 controls the feedback ratio for frequencies below 500 cycles. Feedback at frequencies above 2000 cycles may be either reduced or increased by means of the treble control. Thus the mid-frequencies are established at a desired fixed level and the levels of the bass and treble frequencies are independently controllable.

It will be seen that in this circuit the treble control is effected entirely by feedback, whereas the bass control is effected both by input attenuation and by feedback. Isolation between the two controls is effected in the feedback network. The result of this is that losses are reduced to a minimum and the circuit provides a net gain.

By way of example, in a physical embodiment of the invention the elements have the following values.

| | | |
|---|---|---|
| Capacitors **16** and **17**, each | microfarad | .047 |
| Capacitor **18** | micro-microfarads | 8200 |
| Capacitor **19** | microfarad | .033 |
| Resistor **13** | kilohms | 15 |
| Resistors **12** and **20**, each | do | 500 |
| Resistor **14** | do | 2.2 |

Resistor 14 may be omitted and a tap may be provided on the collector load of transistor 11 for the feedback connection.

While a preferred embodiment of the invention has been illustrated and described, it will be understood that the invention is not limited thereto but contemplates such modifications and further embodiments as may occur to those skilled in the art.

We claim:

1. In a tone control circuit; a transistor; a first resistor; a manually-movable tap on said resistor connected to the base of said transistor; capacitive means connected between said tap and each end of said resistor; an input connection to one end of said resistor; a feedback connection including a second resistor connected between the other end of said first resistor and the collector circuit of said transistor; a resistor and capacitive means serially connected between said base and a point of fixed reference potential; and a manually-movable tap on said last-recited resistor connected to a point on said feedback connection intermediate said second resistor and the collector circuit of said transistor.

2. In a tone control circuit; a transistor; a first resistor; a manually-movable tap on said resistor connected to the base of said transistor; a pair of capacitors connected respectively between said tap and the ends of said resistor; an input connection to one end of said resistor; a feedback connection including a second resistor connected between the other end of said first resistor and the collector circuit of said transistor; a pair of capacitors and an intermediate resistor serially connected between said base and a point of fixed reference potential; and a manually-movable tap on said last-recited resistor connected to a point on said feedback connection intermediate said second resistor and the collector circuit of said transistor.

3. In a transistor audio circuit; first and second transistors; first and second resistors serially connected in a feedback connection between said first transistor and the collector of said second transistor; a manually-movable tap on said first resistor connected to the base of said second transistor; capacitive means connected between said tap and each end of said first resistor; a resistor and capacitive means serially connected between said base and a point of fixed reference potential; and a manually-movable tap on said last-recited resistor connected to said feedback connection so as to be isolated from said first resistor by said second resistor.

4. In a transistor audio circuit; first and second transistors; first and second resistors serially connected in a feedback connection between said first transistor and the collector of said second transistor; a manually-movable tap on said first resistor connected to the base of said second transistor; a pair of capacitors connected respectively between said tap and the ends of said first resistor; a pair of capacitors and an intermediate resistor serially connected between said base and a point of fixed reference potential; and a manually-movable tap on said last-recited resistor connected to said feedback connection so as to be isolated from said first resistor by said second resistor.

5. In a transistor audio circuit; first and second transistors; first, second and third resistors serially connected between said first transistor and the collector of said second transistor; a manually-movable tap on said first resistor connected to the base of said second transistor; capacitive means connected between said tap and each end of said first resistor; a resistor and capacitive means serially connected between said base and a point of fixed reference potential; and a manually-movable tap on said last-recited resistor connected to the junction of said second and third resistors.

6. In a transistor audio circuit; first and second transistors; first, second and third resistors serially connected between said first transistor and the collector of said second transistor; a manually-movable tap on said first resistor connected to the base of said second transistor; a pair of capacitors connected respectively between said tap and the ends of said first resistor; a pair of capacitors and an intermediate resistor serially connected between said base and a point of fixed reference potential; and a manually-movable tap on said intermediate resistor connected to the junction of said second and third resistors.

References Cited in the file of this patent

UNITED STATES PATENTS

| | | |
|---|---|---|
| 2,695,337 | Burwen | Nov. 23, 1954 |
| 2,761,921 | Kuhl | Sept. 4, 1956 |
| 2,994,040 | Waldhauer | July 25, 1961 |

FOREIGN PATENTS

| | | |
|---|---|---|
| 512,969 | Canada | May 17, 1955 |